(12) United States Patent
Goodman et al.

(10) Patent No.: US 9,274,708 B2
(45) Date of Patent: *Mar. 1, 2016

(54) THICK AND THIN DATA VOLUME MANAGEMENT

(71) Applicant: GLOBALFOUNDRIES INC., Grand Cayman (KY)

(72) Inventors: Daniel I. Goodman, Beit Shemesh (IL); Rivka M. Matosevich, Zicron-Ya'acov (IL); Orit Nissan-Messing, Hod HaSharon (IL)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,119

(22) Filed: May 13, 2015

(65) Prior Publication Data

US 2015/0248241 A1    Sep. 3, 2015

Related U.S. Application Data

(63) Continuation of application No. 14/078,077, filed on Nov. 12, 2013, now Pat. No. 9,053,002.

(51) Int. Cl.
| | |
|---|---|
| *G06F 3/00* | (2006.01) |
| *G06F 3/06* | (2006.01) |
| *G06F 12/02* | (2006.01) |
| *G06F 17/30* | (2006.01) |

(52) U.S. Cl.
CPC ............. *G06F 3/0608* (2013.01); *G06F 3/067* (2013.01); *G06F 3/0619* (2013.01); *G06F 3/0631* (2013.01); *G06F 3/0644* (2013.01); *G06F 3/0665* (2013.01); *G06F 3/0689* (2013.01); *G06F 12/02* (2013.01); *G06F 17/30* (2013.01); *G06F 2003/0692* (2013.01)

(58) Field of Classification Search
CPC ............................. G06F 17/30; G06F 3/0608
See application file for complete search history.

(56) References Cited

U.S. PATENT DOCUMENTS

| | | | |
|---|---|---|---|
| 7,065,616 B2 | 6/2006 | Gajjar et al. | |
| 7,089,381 B2 | 8/2006 | Horn et al. | |
| 7,376,786 B2 | 5/2008 | Williams | |
| 7,657,613 B1 | 2/2010 | Hanson et al. | |

(Continued)

OTHER PUBLICATIONS

Kang et al., Virtual Allocation: A Scheme for Flexible Storage Allocation, Oct. 13, 2004, 6 pages, Proceedings of the OASIS workshop in conjunction with ASPLOS, Association for Computing Machinery, Washington DC, Texas A&M University, Boston, MA.

(Continued)

*Primary Examiner* — Zachary K Huson

(57) ABSTRACT

Methods, apparatus and computer program products implement embodiments of the present invention that include configuring one or more storage devices as a plurality of physical storage units, each of the physical storage units having a storage granularity, and configuring, on the one or more storage devices, a thin provisioned storage pool having a physical number of the physical storage units and a logical number of logical storage units. Upon receiving a request to create a thick data volume having a requested number of the physical storage units, an available number of the physical storage units that are available in the thin provisioned pool can be identified. A certain number of physical storage units are then allocated based upon a determination of the identifying.

20 Claims, 5 Drawing Sheets

(56) References Cited

U.S. PATENT DOCUMENTS

| | | |
|---|---|---|
| 7,797,468 B2 | 9/2010 | Shin et al. |
| 7,945,640 B1 | 5/2011 | Vantine |
| 8,341,119 B1 | 12/2012 | Roussos et al. |
| 8,402,118 B2 | 3/2013 | Finnegan et al. |
| 8,478,845 B2 | 7/2013 | Agarwala et al. |
| 2007/0233868 A1 | 10/2007 | Tyrrell et al. |
| 2008/0313414 A1 | 12/2008 | Shackelford |
| 2009/0240880 A1 | 9/2009 | Kawaguchi |
| 2010/0138605 A1 | 6/2010 | Kazar et al. |
| 2010/0306467 A1 | 12/2010 | Pruthi et al. |
| 2011/0022642 A1 | 1/2011 | Demilo et al. |
| 2011/0131443 A1 | 6/2011 | Laor et al. |
| 2012/0198073 A1 | 8/2012 | Srikanth et al. |
| 2012/0198190 A1 | 8/2012 | Hart et al. |
| 2013/0067164 A1 | 3/2013 | Velayudhan et al. |
| 2013/0111471 A1 | 5/2013 | Chandrasekaran |
| 2013/0117448 A1 | 5/2013 | Nahum et al. |
| 2013/0246922 A1 | 9/2013 | Doerr et al. |
| 2014/0068211 A1* | 3/2014 | Fiske et al. ............... 711/162 |
| 2014/0156956 A1* | 6/2014 | Ezra ........................ 711/162 |

OTHER PUBLICATIONS

A System and Method for Providing Meta-data Model Based Distributed Data, Feb. 3, 2012.

Method and System for Extracting Meta-data for Interactions over Collaborative Applications, Aug. 26, 2010.

Papazoglou et al., "Blueprinting the cloud," pp. 74-79, IEEE 15.6 (2011), Internet Computing.

Office Action Communication Dated Nov. 4, 2015, U.S. Appl. No. 14/866,531, pp. 1-7.

U.S. Appl. No. 14/866,531, Notice of Allowance dated Nov. 20, 2015, 7 pages.

* cited by examiner

THICK AND THIN DATA VOLUME MANAGEMENT

RELATED APPLICATIONS

This Application is a Continuation of U.S. patent application Ser. No. 14/078,077, filed Nov. 12, 2013, the contents therein hereby incorporated by reference in their entirety.

FIELD OF THE INVENTION

The present invention relates generally to data storage, and specifically to managing thick and thin data volumes created in thin and thick provisioned storage pools.

BACKGROUND

In computer storage arrays (also referred to herein as storage systems or storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region is a sequence of bytes having a specific length, typically one megabyte) into larger virtual regions that administrators can re-size or move, potentially without interrupting system use.

The description above is presented as a general overview of related art in this field and should not be construed as an admission that any of the information it contains constitutes prior art against the present patent application.

SUMMARY

Various embodiments for managing thick and thin data volumes created in thin and thick provisioned storage pools are provided. In accordance with an embodiment of the present invention a storage system, including one or more storage devices, and a processor arranged to configure the one or more storage devices as a plurality of physical storage units, each of the physical storage units having a storage granularity, to configure, on the one or more storage devices, a thin provisioned storage pool having a physical number of the physical storage units and a logical number of logical storage units, and upon receiving a request to create a thick data volume having a requested number of the physical storage units, to identify an available number of the physical storage units that are available in the thin provisioned pool, and to allocate a certain number of physical storage units based upon a determination of the identifying.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
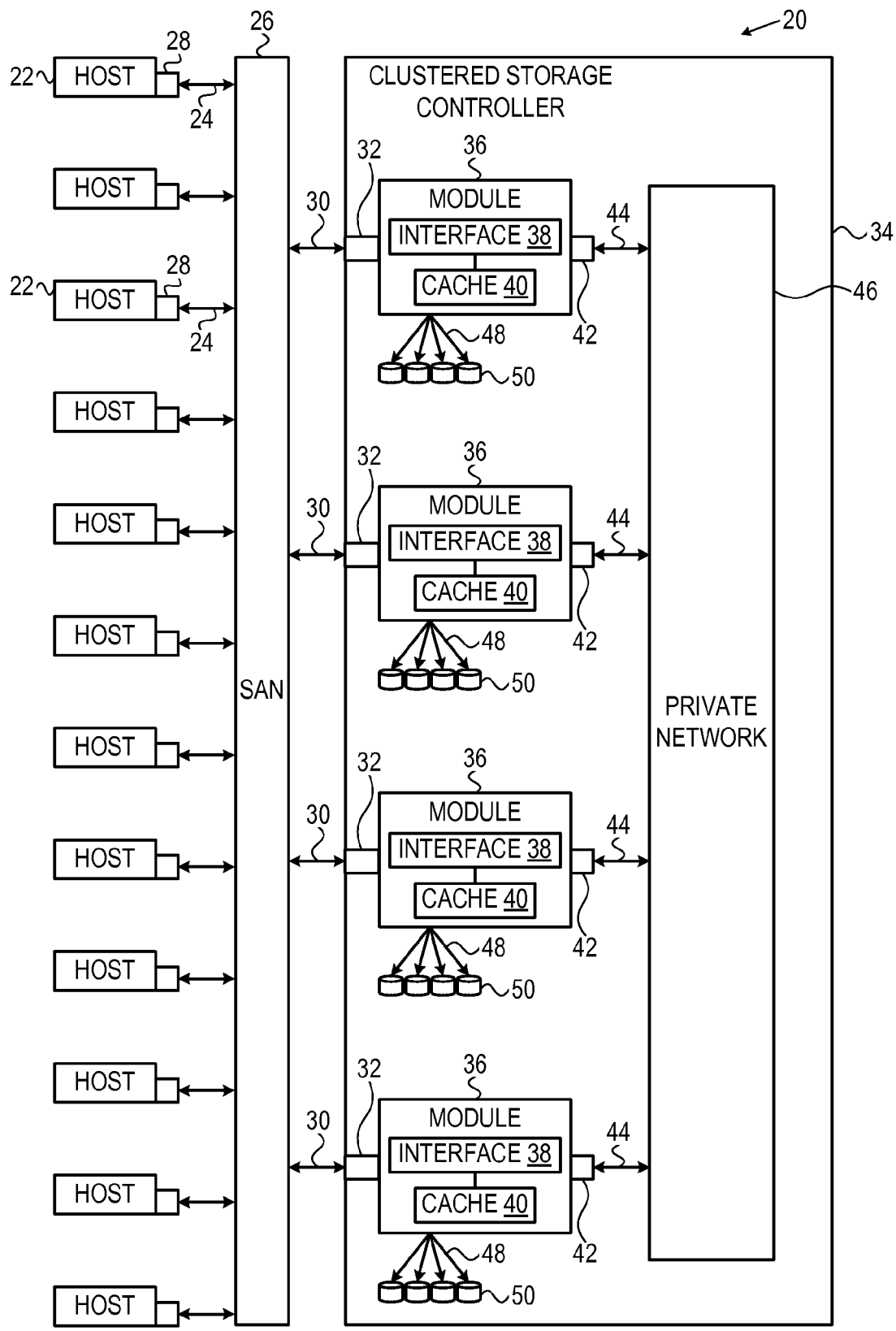
FIG. 1 is a block diagram that schematically illustrates a storage system, in accordance with an embodiment of the present invention.

Thin provisioning is a method used in storage system to optimize utilization of available storage. Instead of allocating all requested physical blocks of data (referred to herein as storage units) to data volumes up front, thin provisioning implements on-demand allocation of the storage units to the data volumes. This methodology helps eliminate almost all "whitespace" (i.e., storage units allocated to data volumes but not storing any data), thereby improving storage utilization rates over storage allocation methods such as thick provisioning that allocate, to individual data volumes, storage units that may remain unused (i.e., not storing any data).

Thin provisioning implements an over-allocation (or over-subscription) mechanism that enables a storage system to view additional storage capacity than has been physically reserved on the storage system itself. In thin provisioning, physical storage space is either physical storage space or logical storage space, wherein the physical storage space is either reserved or used. Reserved physical storage space comprises an amount of storage space that is allocated to a storage pool (storage pools are described hereinbelow), and used storage space comprises an amount of reserved physical storage space that is currently used to store data. For a given data volume, the logical space comprises the given volume's reported capacity, and for a given storage pool, the logical space comprises a maximum size for all data volumes in the pool.

Over-allocation enables flexibility in growth of data volumes, without having to predict accurately how much a given data volume will grow. Instead, storage unit growth becomes sequential. Physical storage capacity on the array is only dedicated when data is actually written by a host computer (or another entity such as a SCSI host or a server), not when the storage volume is initially allocated. The servers, and by extension the applications that reside on them, view a full size data volume from the storage but the storage itself only allocates the blocks of data when they are written.

In storage systems implementing thin provisioning, data volumes can be created from storage pools, wherein the data volumes are either thick volumes or thin volumes and wherein the storage pools are either thin provisioned pools or thick provisioned pools. A storage pool whose logical size is greater than its physical size is can be referred to as a thin provisioned storage pool, and a storage pool whose logical size equals its physical size can be referred to as a thick provisioned pool. Likewise, a data volume whose logical size is greater than its physical size is can be referred to as a thin volume, and a data volume whose logical size equals its physical size can be referred to as a thick volume. In some embodiments, a thick volume may comprise a given volume created as a thin volume, but whose physical size equals its logical size (i.e., a fully allocated thin volume).

Embodiments of the present invention provide methods and systems for managing thin and thick provisioned storage pools in order to create thick and thin volumes. As described hereinbelow, a first embodiment includes methods and systems for creating a thick volume from a thinly provisioned pool, a second embodiment includes methods and systems for storing multiple data volumes "end-to-end" in one or more storage units, and a third embodiment includes methods and systems for defining and managing a grouped pool that includes multiple thick and/or thin provisioned storage pools.

In the first embodiment, one or more storage devices can be configured as a plurality of physical storage units, wherein each of the physical storage units has a storage granularity. Subsequent to configuring the one or more storage devices, a thin provisioned storage pool can be configured on the one or more storage devices, wherein the thin provisioned storage pool has a physical number of the physical storage units and a logical number of logical storage units, the physical number being less than the logical number. Upon receiving a request to create a thick data volume having a requested number of the physical storage units, an available number of the physical storage units that are available in the thin provisioned pool can be identified. Upon determining that the requested number is less than the available number, the requested number of the physical storage units can be allocated from the thin provisioned storage to the thick data volume.

In the second embodiment, one or more storage devices can be configured as a plurality of physical storage units, wherein each of the physical storage units has a storage granularity. Subsequent to configuring the one or more storage devices, a request can be received to create a requested multiple of data volumes, wherein each of the requested multiple of the data volumes has a requested maximum physical size. In response to the storage granularity, a minimum number of the physical storage units can be determined whose total storage size is greater than or equal to a total of the requested physical size. The determined minimum number of the physical storage units can be allocated from the one or more of the storage devices, and the requested multiple of the data volumes can be stored, to the allocated physical storage units, contiguously and in an end-to-end configuration.

In the third embodiment, one or more storage devices can be configured as a plurality of physical storage units. Subsequent to configuring the one or more storage devices, multiple storage pools can be configured, wherein each of the multiple storage pools has one or more respective pool attributes, and a grouped pool can be defined, the grouped pool comprising the multiple storage pools. Upon receiving a request to create a data volume having one or more volume attributes and comprising a requested number of the physical storage units, a given storage pool can be identified in response to a comparison between the one or more pool attributes thereof and the one or more volume attributes thereof. Subsequent to identifying the given storage pool, an available number of the physical storage units in the given storage pool can be detected. Upon determining that the requested number of the physical storage units is greater than the available number of the physical storage units, a number can be computed comprising the available number of the physical storage units subtracted from the requested number of the physical storage units, and the computed number of the physical storage units can be transferred, from within the grouped pool, to the identified storage pool.

When executing a hypervisor to implement multiple virtual machine each having virtualized storage, in addition to a given data volume used by a given virtual machine, a respective meta volume is typically defined to store configuration data for the virtual machine and its respective virtualized storage. As the storage systems support increasing numbers of virtual machine instances, embodiments of the present invention enable the storage systems to utilize storage space more efficiently.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on data volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a data volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a data volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs) or an InfiniBand™ fabric. Clustered storage controller 34 implements clusters of storage modules 36, some of which include an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, each of the logical storage devices may be referred to as a logical unit, and when made accessible by a given host computer 22, a logical unit number (LUN). While each LUN can be addressed as a single logical unit, the LUN may comprise a combination of high capacity hard disk drives and/or solid state disk drives.

Figure 2:
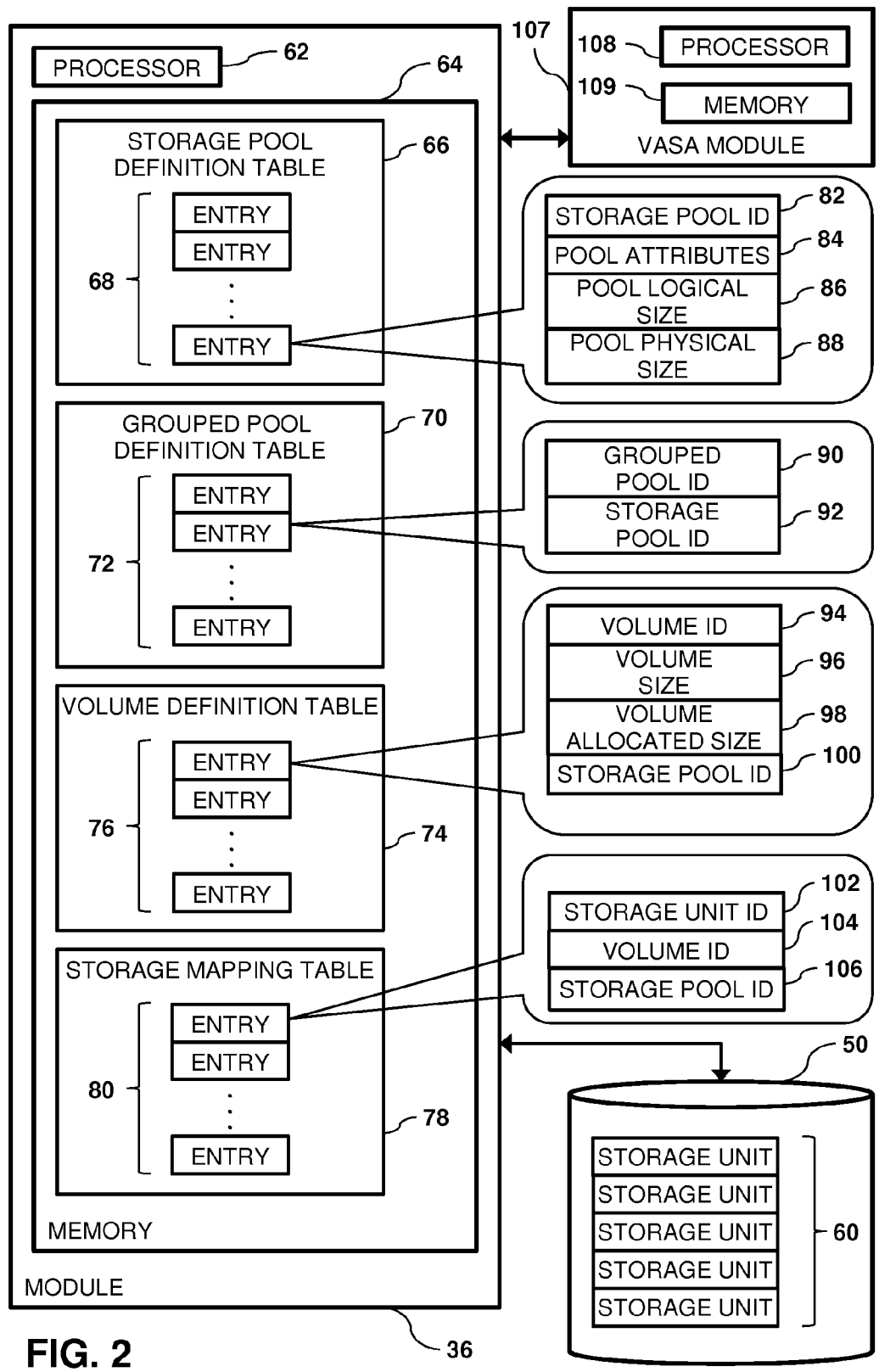
FIG. 2 is a block diagram of a module of the storage system arranged to manage thick and thin data volumes in thick and thin provisioned storage pools, in accordance with an embodiment of the present invention.

FIG. 2 is a block diagram of a given module 36, in accordance with a first embodiment of the present invention. In embodiments described herein, each storage device 50 is divided into multiple storage units 60 (also referred to herein as blocks or data blocks), wherein each of the storage units comprises a sequence of bytes having a fixed size. While the example shown in FIG. 2 shows each storage unit 60 stored on a single storage device, each of the storage unit may comprise multiple "slices" of storage space spread among multiple storage devices 50.

Module 36 comprises a module processor 62 and a memory 64 that is configured to store a storage pool definition table 66 having entries 68, a grouped pool definition table 70 having entries 72, a volume definition table 74 having entries 76 and a storage mapping table 78 having entries 80. In operation, a manager node (not shown) in storage controller 34 can be configured to manage one or more storage pools, and to manage one or more data volumes within each of the one or more storage pools.

Each given storage pool on storage controller 34 has a corresponding entry 68 in storage pool definition table 66 that stores metadata defining the given storage pool. Each entry 68 comprises a storage pool identifier 82, a pool attribute 84, a pool logical size 86 and a pool physical size 88. Pool logical size 86 comprises a number of logical storage units 60 that are available to the given storage pool, and pool physical size 88 comprises a number of physical storage units 60 that are available to the given storage pool.

Attributes 84 describe how data in the given pool is stored. Examples of attributes 84 include, but are not limited to, a pool type indictor, and a storage class. The pool type indicator can indicate if the given storage pool is a thick pool or a thin pool. Typically, volumes created in a given storage pool inherit attributes (e.g., the pool type indicator) of the given storage pool. In other words, volumes created in thick pools are thick volumes and volumes created in thin pools are thin volumes. In embodiments where storage devices 50 comprises a combination of small capacity fast hard disks, large capacity slower hard disks and solid state drives (SSDs), the storage class attribute can indicate which type of storage device(s) 50 to be used to provide storage units 60 to the given pool. Additional examples of devices 50 include, but are not limited to, serial advanced SCSI (SAS) drives and serial ATA advanced technology attachment (SATA) drives.

In operation, a given host computer 22 may implement a virtualized environment having virtualized storage by executing a hypervisor such as ESX™ or ESXi™, which are produced by VMware Inc., Palo Alto, Calif. To implement an application program virtualized environment, storage controller 34 may be coupled to a vStorage APIs for Storage Awareness (VASA™) provider module 107 comprising a VASA processor 108 and a VASA memory 109. When executing a hypervisor, VASA provider module 107 provides a given host computer 22 with a set of APIs that enable storage controller 34 to interact with the hypervisor for management functionality.

As explained hereinbelow, processor 62 can combine multiple storage pools to create a grouped pool. In other words, the grouped pool has multiple "sub-pools". Grouped pools can be configured to have a capability to move storage units 60 between their respective sub-pools.

Each given grouped pool on storage controller 34 has one or more corresponding entries 72 in grouped pool definition table 70 that store information on the storage pools that make up the given grouped pool. Each entry 72 comprises a grouped pool identifier 90 and a storage pool identifier 92. For example, if a given grouped pool comprises three storage pools, then grouped pool definition table can store three entries 72 for the given storage pool, wherein each of the three entries store a storage pool identifier for the given grouped pool and a distinct storage pool identifier 92. In an alternative implementation, a given pool identifier 90 can have one or more storage pool identifiers 92.

Each given data volume on storage controller 34 has a corresponding entry 76 in volume definition table 74 that stores metadata defining the given volume. Each entry 76 comprises a volume identifier 94, a volume size 96, a volume allocated size 98 and storage pool identifier 100. Storage pool identifier 100 identifies a given storage pool that can used when allocating physical and/or logical storage units 60 to the given volume. As described supra, the given storage pool indicates if the given volume is a thin volume or a thick volume.

Each given storage unit 60 storage devices 50 has a corresponding entry 80 in storage mapping table 78 that indicates a status of the given storage unit. Each entry 80 comprises a storage unit identifier 102, a volume identifier 104 and storage pool identifier 106. If the given storage unit is not being used by storage controller 34, then volume identifier 104 and storage pool identifier 106 are both null. If the given storage unit is currently assigned to a given storage pool but is not currently assigned to a given data volume, then volume identifier 104 is null and storage pool identifier 106 indicates the given storage pool. If the given storage unit is currently assigned to a given data volume, then volume identifier 104 indicates the given data volume and storage pool identifier 106 indicates the given storage pool.

Processors 62 and 108 typically comprise a general-purpose computer, which are programmed in software to carry out the functions described herein. The software may be downloaded to module 36 and VASA module 107 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Creating a Thick Data Volume in a Thin Pool

Figure 3:
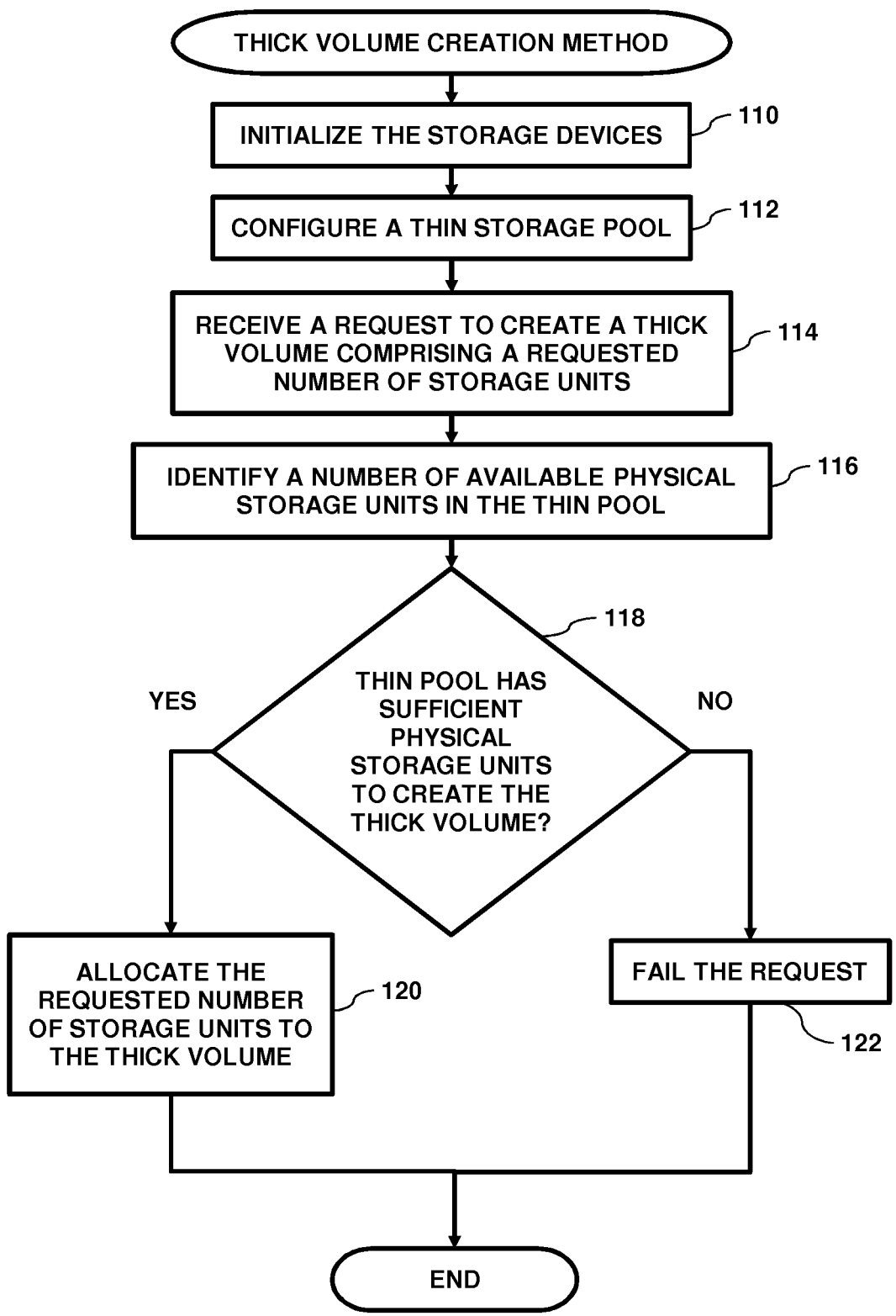
FIG. 3 is a flow diagram that schematically illustrates a method of creating a given thick volume in a thin provisioned storage pool, in accordance with a first embodiment of the present invention.

FIG. 3 is a flow diagram that schematically illustrates a method of creating a thick data volume using storage units 60 from a thin pool, in accordance with an embodiment of the present invention. In an initialization step 110, processor 62 initializes storage device 50. To initialize storage device 50, processor 62 first configures storage device as multiple storage units 60 so that each of the storage units has a storage granularity (i.e., a fixed size).

In a configuration step 112, processor 62 configures a thin provisioned storage pool (also referred to herein as a thin pool) by assigning a logical number of storage units 60 and a physical number of storage units 60 to the thin pool. The assigned number logical number of storage units 60 comprises the thin pool's logical size, and the assigned number of physical storage units 60 comprises the thin pool's physical size. In the thin provisioned storage pool, the physical number is less than the logical number (i.e., the thin pool's physical size is smaller than the thin pool's logical size).

While configuring the thin pool, processor 62 can add a given entry 68 to table 66, populate the given entry 69 with the thin pool's metadata, identify one or more entries 80 in storage mapping table 78 that are associated with the storage units assigned to the thin pool, and update the storage pool identifier in the identified one or more entries 80 to indicate that the one or more storage units 60 are assigned to the thin pool.

In a receive step 114, processor 62 receives a request to create a thick data volume comprising a requested number of storage units 60 from the thin pool, and upon receiving the request, in an identification step 116, the processor identifies available number of storage units 60 that are available in the thin pool. In the configuration shown in FIG. 2, the available number of storage units 60 comprises pool physical size 88 in a given entry 68 in storage pool definition table 66 whose storage pool identifier 82 matches the thin pool.

In a comparison step 118, if the thin pool has a sufficient number of storage units 60 to create the requested thick volume, then in an allocation step 120, processor 62 allocates the requested number of storage units 60 to the volume and the method ends. Returning to step 118, if the thin pool does not have a sufficient number of storage units 60 to create the requested thick volume, then in a fail step 122, processor 62 fails the volume creation request, and the method ends.

In some embodiments, processor 62 can determine an available number of physical storage units based on a number of data volumes in the thin provisioned storage pool and a respective amount of data stored in each of the data volumes. To detect if the thin pool has a sufficient number of storage units 60, processor 62 can check if the requested number is less than the available number, and the processor can allocate the requested number of storage units 60 by first adding an entry 76 to volume definition table 74, and in the added entry, updating volume identifier 94 to indicate the requested thick volume, storing the requested number of storage units 60 to volume logical size 96 and volume allocated size 98, and updating storage pool identifier 100 to indicate the thick pool.

Processor 62 can then identify the requested number of entries 80 in storage mapping table 78 where volume identifier 104 indicates the thin pool and volume identifier 104 is null (i.e., the storage units with the identified entries are allocated to the thin pool but are not allocated to any data volume) and update volume identifier 104 in the identified entry/entries (80) to indicate the requested thick volume. Finally, processor 62 can locate the entry 68 in storage pool definition table 66 for the thick pool, and in the located entry 68, and reduce pool logical size 86 and pool physical size 88 by the requested number of storage units 60.

In some embodiments, processor 62 can determine a number of logical storage units that are available in the thin pool, and allocate the requested number of storage units 60 from the thin pool upon determining that the requested number of storage units is less than the number of the logical storage units that are available in the thin pool. In operation, processor 62 can determine the number of logical storage units that are available in the thin provisioned storage pool based a number of data volumes in the thin provisioned storage pool and the storage granularity. In further embodiments, upon checking the available number of logical storage units, processor 62 can fail the request (similar to step 122) upon determining that the requested number is greater than or equal to the available number of logical storage units.

Storing Volumes End-to-End

Storage systems that store data to fixed sized blocks such as storage units 60 may waste storage resources if data volumes use less space than the size (also referred to herein as a granularity) of the fixed sized blocks. For example, if the granularity is 16 GB and the storage system stores ten 4 GB volumes, then the storage system typically allocates a 16 GB storage unit 60 to each volume, thereby allocating 160 GB of storage space to store 40 GB of data. Similarly, if the storage system allocates two 16 GB storage units 60 to store an 18 GB volume, then the storage system allocated 14 GB of extra storage space to the volume.

Figure 4A:
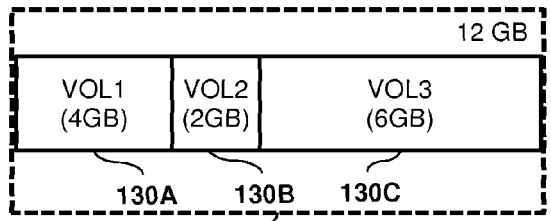
FIGS. 4A and 4B are block diagrams of storage units in the storage system storing multiple data volumes in an end-to-end configuration, in accordance with a second embodiment of the present invention.
Figure 4B:
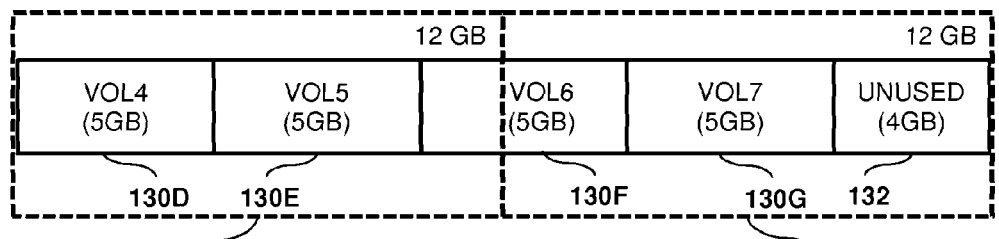
Figure 5:
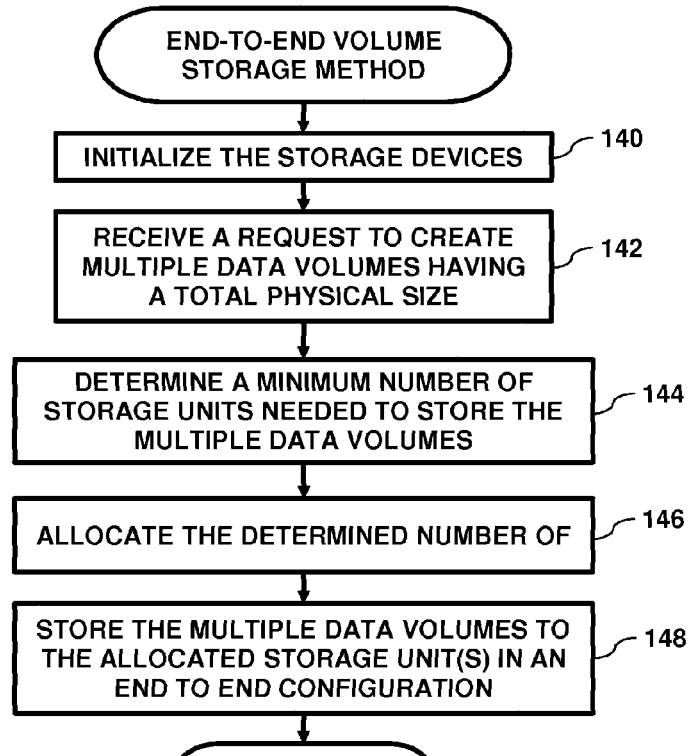
FIG. 5 is a flow diagram that schematically illustrates a method of storing multiple data volumes in an end-to-end configuration, in accordance with the second embodiment of the present invention.

FIGS. 4A and 4B are block diagrams of storage units 60 storing multiple data volumes 130 in an end-to-end configuration, and FIG. 5 is a flow diagram that schematically illustrates a method of storing the data volumes in the end-to-end configuration, in accordance with an embodiment of the present invention. The example shown in FIGS. 4A and 4B shows three storage units 60, each having a granularity of 12 GB, that can be differentiated by appending a letter to the identifying numeral, so that the storage units comprise storage units 60A-60C. Likewise, the seven data volumes 130 shown in the figure can be differentiated by appending a letter to the identifying numeral, so that the data volumes comprise data volumes 130A-130G.

In an initialization step 140, processor 62 initializes storage device 50. To initialize storage device 50, processor 62 first configures storage devices 50 as multiple storage units 60 so that each of the storage units has a storage granularity (i.e., a fixed size).

In a receive step 142, processor 62 receives a request to create multiple volumes 130, each the requested multiple of the data volumes having a requested maximum physical size. In a determination step 144, processor 62 determines, in response to the storage granularity, a minimum number of storage units 60 that are needed to store the multiple volumes in an end-to-end configuration, wherein the number comprises a minimum multiple of the storage granularity number of storage units 60 whose total storage size is greater than or equal to a total of the requested physical sizes.

To determine the minimum number of storage units 60, processor 62 can round up the total of the requested physical sizes to the next multiple of the storage granularity. For example, if the storage granularity is 12 GB and the total of the requested physical sizes is 6 GB, then the minimum number of storage units 60 is one (i.e., one 12 GB granularity). Similarly, if the total of the requested physical sizes is 16 GB, then the minimum number of storage units 60 is two (i.e., two 12 GB granularities comprising 24 GB of storage space).

In an allocation step 146, processor 62 allocates the determined number of storage units 60 from a given storage pool to the multiple data volumes. Finally, in a storing step 148, processor 62 stores the multiple volumes to the allocated storage unit(s) 60 in an end-to-end configuration, and the method ends. In other words, when storing the multiple volume in the end-to-end configuration, processor 62 stores the multiple volumes contiguously to the allocated storage unit(s) 60 as if the multiple volumes were a single volume.

In the example shown in FIG. 4A, the multiple volumes comprise volumes 130A, 130B and 130C having a total requested physical size of 12 GB, where volume 130A has a physical size of 5 GB, volume 130B has a physical size of 2 GB and volume 130C has a physical size of 6 GB. Since 12 GB is also the storage granularity of storage units 60, processor 62 can allocate a single storage unit 60A to store volumes 130A-130C in an end-to-end configuration (and with no wasted storage space) as shown in FIG. 4A.

In embodiments where a single given storage unit 60 is allocated to a single given volume 130, storage mapping table has a single given entry 80 for the given storage unit, and the volume identifier in the given entry indicates the given volume. However, in embodiments where processor 62 allocates the given storage unit 60 to multiple volumes 130, storage mapping table 78 can have a distinct entry for each of the multiple volumes, and an offset (not shown) can be included in the distinct entries.

In the example shown in FIG. 4A, processor 62 can add three entries 80 to storage mapping table 78. In a first added entry, volume identifier 104 can reference volume 130A, storage unit identifier 102 can reference the given storage unit having a respective offset of "0" (i.e., data for volume 130A is stored at the beginning of the given storage unit). In a second added entry, volume identifier 104 can reference volume 130B, storage unit identifier 102 can reference the given storage unit having a respective offset of "5" (i.e., data for volume 130A is stored starting at the fifth gigabyte of the given storage unit). Finally, in a third added entry, volume identifier 104 can reference volume 130C, storage unit identifier 102 can reference the given storage unit having a respective offset of "7" (i.e., data for volume 130C is stored starting at the fifth gigabyte of the given storage unit).

In the example shown in FIG. 4B, the multiple volumes comprise volumes 130D, 130E, 130F and 130G, wherein each of the volumes has a physical size of 5 GB, and the total or the requested physical sizes is 20 GB. Since storage units 60 have a storage granularity of 12 GB, processor 62 can allocate two storage units 60B and 60C to store volumes 130D-130G in an end-to-end configuration as shown in FIG. 4B. Since the total requested physical size of 20 GB is less than two storage granularities (24 GB), example shown in FIG. 4B has 4 GB of unused space 132. Additionally, as shown in the figure, processor 62 can configure volume 13F to span storage units 60A and 60B.

While the method presented in the flow diagram of FIG. 5 shows processor 62 allocating multiple volumes 130 at a single time, subsequently storing an additional volume 130 to a given storage unit 60 in an end-to-end configuration is considered to be within the spirit and scope of the present invention using the following logic:
BEGIN
Receive a request to store an additional volume having a requested size;
IF requested size>=the granularity
Allocate a minimum number of storage units needed to store the additional volume;
Store the additional volume to the allocated storage unit(s);
ELSEIF a previously allocated storage unit having unused storage space is located
IF the unused space>=requested size
Store the additional volume to the identified storage unit in an end-to-end configuration;
ELSE
Allocate a storage unit to the additional volume;
Store the additional volume to the storage unit;
ENDIF
ENDIF
END Defining and Managing Grouped Pools As described supra, a given storage pool can be either a thick pool or a thin pool. Embodiments of the present invention provide methods and systems for defining a third type of pool called a grouped pool. A given grouped pool comprises at least two sub-pools comprising any combination of thin pools and/or thick pools.

Figure 6:
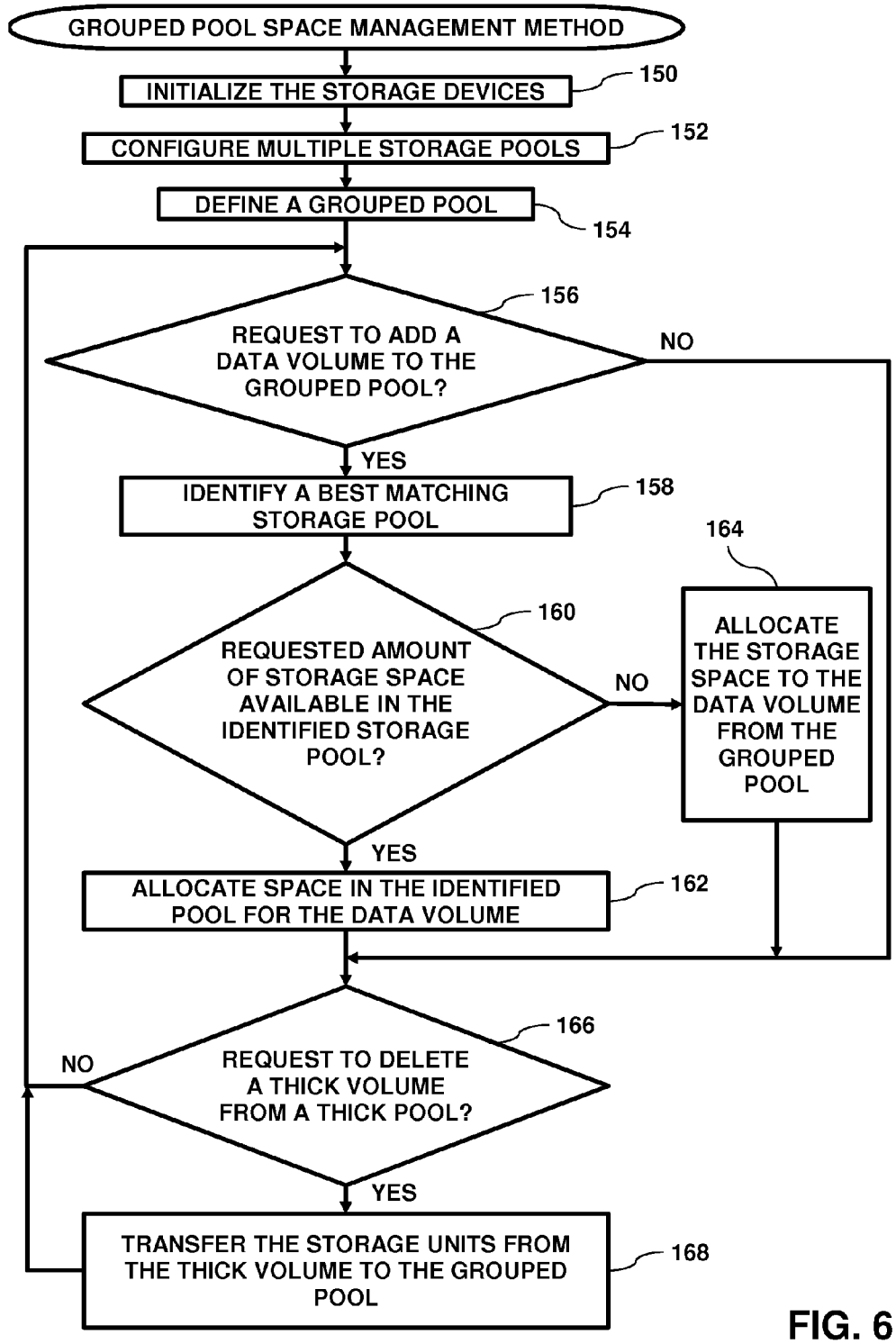
FIG. 6 is a flow diagram that schematically illustrates a method of managing a grouped storage pool, in accordance with a third embodiment of the present invention.

FIG. 6 is a flow diagram that schematically illustrates a method of managing storage units 60 in a grouped pool, in accordance with an embodiment of the present invention. In an initialization step 150, processor 62 initializes storage devices 50. To initialize storage device 50, processor 62 first configures storage device as multiple storage units 60 so that each of the storage units has a storage granularity (i.e., a fixed size).

In a configuration step 152, processor 62 configures zero or more thin provisioned storage pools (also referred to herein as thin pools) and zero or more thick provisioned storage pools (also referred to herein as thick pools) in order to configure multiple storage pools. In embodiments of the present invention, processor 62 can configure any combination of thin and/or thick pools as long as at least two storage pools are configured.

To configure a given storage pool, processor 62 can assign an initial logical number of storage units 60 and an initial physical number of storage units 60 to the given storage pool. The assigned number logical number of storage units 60 comprises the given storage pool's logical size, and the assigned number of physical storage units 60 comprises the given storage pool's physical size.

While configuring the given storage pool, processor 62 can add a given entry 68 to table 66, populate the given entry 69 with the given pool's metadata, identify one or more entries 80 in storage mapping table 78 that are associated with the storage units assigned to the thin pool, and update the storage pool identifier in the identified one or more entries 80 to indicate that the one or more storage units 60 are assigned to the given pool.

Upon configuring the storage pools in step 152, processor 62 can allocate a respective number of storage units 60 to each of the storage pools. In some embodiments, as explained hereinbelow, the respective number of storage units 60 for a given storage pool configured as a thick pool may be zero.

In a definition step 154, processor 62 defines a grouped pool comprising one or more of the storage pools configured in step 152. For example, processor 62 can define a grouped storage pool comprising one thin pool and two thick pools. To define a grouped storage pool comprising one thin pool and two thick pools, processor 62 can first add three entries 72 to grouped pool definition 70. Processor 62 can then update the first added entry 72 so that grouped pool identifier 90 indicates the defined grouped pool and storage pool identifier 92 indicates the thick pool that is to be included in the grouped pool, update the second added entry 72 so that grouped pool identifier 90 indicates the defined grouped pool and storage pool identifier 92 indicates the first of the thin pools that is to be included in the grouped pool, and update the third added entry 72 so that grouped pool identifier 90 indicates the defined grouped pool and storage pool identifier 92 indicates the second of the thin pools that is to be included in the grouped pool.

In a first comparison step 156, if processor 62 receives a request to add a data volume to the grouped pool, the request including one or more volume attributes, then in an identification step 158, the processor compares the one or more volume attributes to each of the one or more pool attributes of each storage pool in the grouped pool, and identifies a given storage pool in response to the comparison. In other words, processor 62 identifies a given storage pool whose respective pool attribute(s) are most similar to the requested volume attributes in order to identify a best matching storage pool in the grouped pool.

To identify the best matching storage pool, the request may include one or more attributes for the requested volume, and processor 62 can calculate a volume score using the received one or more volume attributes, calculate, for each respective storage pool in the grouped pool, a respective pool score using the respective storage pool's one or more pool attributes, and identify the given pool whose respective pool score is closest to the volume score.

Examples of volume attributes include, but are not limited to:

A volume type indicating if the requested volume comprises (a) a thin volume having a first physical size (i.e., a number of physical storage units 60) and a second logical size (i.e., a number of logical storage units 60), the first number less than the second number, (b) a thin volume having a third physical size and a fourth logical size, the third number equal to the fourth number, and (c) a thin volume having a fifth physical size and a fifth logical size, the fifth number equal to the sixth number.

A storage class for the volume that indicates a preferred storage device type for the volume. Examples of storage classes include, but are not limited to disk drives, solid state drives (SSDs), serial advanced SCSI (SAS) drives and serial ATA advanced technology attachment (SATA) drives. For example, when defining a given data volume a system administrator can indicate, in the request, a preferred storage class.

An identity of a virtual machine that stores the volume. As described supra, if processor 62 executes a hypervisor to implement virtualized storage, a given pool attribute 84 can indicate an identity of a given virtual machine associated with a given data volume (i.e., a given SLU), and in instances where the processor receives the request from a given virtual machine, then the processor may assign a higher score to a first storage pool storing an existing volume for the virtual machine and a lower score to a second storage pool not storing any volumes for the virtual machine.

A volume size. The requested volume's size can indicate the requested number of number of storage units 60 for the requested volume. In operation processor 62 can assign a higher score as a function of how the requested number of storage units 60 "fits" into each of the storage pools. By scoring the entity sizes, processor 62 can locate a "best fit" for the requested data volume.

Examples of pool types include, but are not limited to:

A pool type indicating if a given storage pool is a thick pool or a thin pool.

A pool storage class indicating a type of storage devices used to store the storage units in a given pool. Examples of pool storage classes include disk drives, SSDs, SAS drives and SATA drives.

An identity of a virtual machine. As described supra, if processor 62 executes a hypervisor to implement virtualized storage, a given pool attribute 84 can indicate an identity of a given virtual machine associated with a given storage pool. As described supra, upon processor receive a volume creation request from a given virtual machine, processor 62 may assign a higher score to a first storage pool storing an existing volume for the virtual machine and a lower score to a second storage pool not storing any volumes for the given virtual machine.

Available space. A given pool's available space can indicate a number of available (i.e., not allocated to any data volume) storage units 60. As described supra, upon receiving a request to create a data volume having a requested size, processor 62 can assign a higher score as a function of how the requested number of storage units 60 "fits" into each of the storage pools.

In a second comparison step 160, if processor 62 detects that the identified "best matching" storage pool has the requested number of storage units 60 available, then in a first allocation step 162 the processor allocates the requested number of storage units 60 in the identified storage pool to the requested volume. However, if the requested number of storage units 60 is greater than the number of storage units available in the identified pool, then in a second allocation step 164, processor 62 computes a number comprising the available amount of storage units subtracted from the requested number of storage units, transfers the computed number of storage units 60 from another storage pool in the grouped pool, and upon performing the transfer, allocates the requested number of the storage units to the requested volume.

To determine how many storage units 60 need to be transferred, processor 62 can compute a number comprising the available amount of storage units in the identified pool subtracted from the requested number of storage units. Upon computing the number, processor 62 can then transfer, within the grouped pool (i.e., from another storage pool in the grouped pool) the computed number of storage units 60 to the identified storage pool.

In some embodiments, the identified pool comprises a first given pool, and processor 62 can transfer the computed number of the storage units by identifying a second given storage pool in the grouped pool having the computed number of storage units available, and transferring the computed number of storage units from the second given storage pool to the first given storage pool. For example, in step 154 processor 62 can define a grouped pool having a first given storage pool comprising a thick pool and a second given storage pool comprising a thin pool, and allocate all the logical and physical storage units 60 to the thin pool. In other words, no logical and/or physical regions are initially assigned to the thick pool.

In this example, upon receiving a request to create, in the grouped pool, a thick volume having a requested number of storage units 60, processor 62 can transfer the requested number of storage units (i.e., both physical and logical) from the thin pool to the thin pool and allocate the transferred storage units 60 to the requested volume. Upon transferring the requested number of storage units 60 from the thin pool to the thick pool, processor 62 can reduce the thin pool's logical number of storage units (i.e., logical size) and physical number of storage units (i.e., physical size) by the requested number.

Therefore, in this example, the thick pool is always 100% utilized, since all logical and physical storage units in the thick pool are assigned to one or more volumes.

In a third comparison step 166, if, in configurations implementing this example, processor 62 receives a request to delete the thick volume from the grouped pool's thick pool, then upon deleting the thick volume, the processor transfers the thick volumes storage unit(s) 60 back to the grouped pool's thin pool in a transfer step 168, increments thin pool's logical number of storage units and physical number of storage units by the requested number, and the method continues with step 156.

Returning to step 166, if processor 62 does not receive a request to delete a thick volume from the grouped pool's thick pool, then the method continues with step 156. Returning to step 156, if processor 62 does not receive a request to add a data volume to the grouped pool, then the method continues with step 166.

In some embodiments, some or all the steps in the flow diagram shown in FIG. 6 may be performed by VASA processor 107 (i.e., instead of module processor 62 as described supra).

As described supra, when implementing storage virtualization, processor 62 can create a "meta" volume for each virtual machine instance executing on the processor. In embodiments of the present invention, processor 62 can create a grouped pool comprising a single thick pool and two thin pools for each virtual machine instance. In operation, the grouped can allow free (physical) storage units 60 to be moved between any two pools in the grouped pool in a single atomic operation that enables storage automation to move resources in real time thus easily enabling a given set of storage units 60 to be used for thin or thick volumes.

Storage automation enables a storage system to encapsulate time consuming or repetitive tasks into a best practices policy that can be initiated on command or triggered via an event, with little or no human intervention. Storage automation can include (a) automated provisioning, (b) capacity on demand, (c) host transparent data movement, (d) hot spot elimination, (e) transparent data migration, (f) information life cycle management, and (g) utility storage. Among the issues confronting storage arrays implementing storage automation are concurrent mapping requests and maintaining consistent mapping.

In operation, the thick pool and a first of the thin pools can be used to store data volumes. The logical size of thin volumes in the first thin pool can be calculated using standard business and best practices. The second thin pool can used as a meta pool to store all the meta volumes (i.e. any volume that does not represent a guest operating system disk image or a snapshot). Given a specific hypervisor technology, one or more standard size of the meta volumes can be determined (e.g. a size of the meta volumes holding configuration information, average memory size etc.). Using these standard sizes, an algorithm can be defined that not only determines the correct size of the meta pool based on the number of virtual machines to be supported per container, but more importantly a correct logical size of the volume can be determined to properly plan the correct physical and logical size. This is extremely important where storage arrays have large volume granularity (e.g., greater than 10 GB) and the hypervisor has many meta volumes whose size is at least 50% smaller than the granularity. Without an ability to properly plan space allocation for the meta-volumes the pools may appear to quickly run out of logical resources well before physical resources are exhausted.

In some embodiments, an algorithm can used to determine a correct size of the meta pool based upon number of virtual machines and their average memory sizes, thereby enabling storage systems to pre-create multiple meta-volumes. When creating multiple small volumes at once, embodiments of the present invention can enable to storage system to be more space efficient and pack multiple meta-volumes together into a single storage granularity that would have previously been used by a single volume if the single volume was created alone.

Additionally, processor 62 can report space usage as a number of storage units 60 that are allocated to DATA volumes, and in terms of allocated/supported VMs, for example:

207/800 VMs allocate thereby enabling the storage administrator to perform capacity planning more effectively.

In operation, processor 62 can execute a software application that asks a system administrator to enter, via a system console (not shown), a desired number of virtual machine (VM) instances to execute via a hypervisor, and an average memory and disk size for the instances. Additionally, when implementing thin provisioned storage, the administrator's input can indicate a percentage it should be physically allocating and a target amount of over provisioning.

Upon receiving the input from the system administrator, processor 62 can create a thick pool M whose size can be determined using the formula:

$$(NumVMs)*(TotalStorageSize)*(100-ThinStorage/100) \quad (1)$$

where NumVMs comprises a requested number of VMs, TotalStorageSize comprises an amount of available storage, and ThinStorage comprises a percentage of TotalStorageSize. Processor 62 can then to create a thin pool N whose physical size is calculated using the formula:

$$PhysicalSize=(NumVMs)*(TotalStorageSize)*(100-ThinStorage/100) \quad (2)$$

and whose logical size is calculated using the formula:

$$(ThickSize)*(Overprovision) \quad (3)$$

where ThickSize comprises a size of thick volumes in the thin pool and Overprovision comprises a percentage (i.e., >100%) indicating an amount of overprovisioning.

Processor 62 can then create a thin meta pool O whose size that can be determined by the hypervisor's meta volume set. Given that each VM has a volume A of size X and a volume B of size Y, the following formulas can be used to calculate an the physical and the logical sizes:

$$PhysicalSize=(NumVols)*(X+Y+\ldots) \quad (4)$$

$$LogicalSize=(NumVols)*(granularity/Y+granularity/Y+\ldots) \quad (5)$$

where NumVols comprises a number of requested data volumes in the thin pool and granularity comprises the storage array's storage granularity.

Processor 62 can then create a grouped pool pool_name using the following function call:

$$grouped\_pool\ create\ gp=pool\_name\ thick=M\ thin=N\ meta=O \quad (6)$$

The final step is for processor 62 to pre-create the meta volumes. The number of meta volumes to be created can be determined as a percentage of total VMs, or a fixed number (e.g. 10) or can be determined by using a multiple of the storage granularity to calculate a number that would minimize any remaining storage space in the system. This calculated number n may be different for each meta volume. Given n and size X processor 62 can execute the following function:

$$create\_multiple\_volume\ size=X\ vol1=A1,A2,A3,A4,\ldots,An-1,An \quad (7)$$

The final step is for processor 62 to pre-create the meta volumes. The number of meta volumes to be created can be determined as a percentage of total VMs, or a fixed number (e.g. 10) or can be determined by using a multiple of the storage granularity to calculate a number that would minimize any remaining storage space in the system. This calculated number n may be different for each meta volume. Given n and size X processor 62 can execute the following function:

create_multiple_volume size=
$X,Y,X,Y,X,Y,X,Y,X,Y,X,Y, \ldots$ vol1 =$A1,B1,A2,B2,A3,B3,A4,B4, \ldots, An-1,Bn-1,An, Bn$ In embodiments implementing storage automation, a storage automation entity can perform the following operations:
Maintain a pool of free meta-volumes and assign then to VMs upon receiving requests to create each meta volume. When the pool is almost exhausted the storage automation entity can create a new set of meta volumes as described hereinabove.

Upon receiving requests to create a thin or thick volume the storage automation entity create the requested volumes in either the thin or the thick pool determined by the type of volume(s) requested.

In embodiments where the storage system is configured to enable sharing physical storage between thin and thick volumes, the storage automation entity can initially assign all physical storage to the thin pool. As each command is received to create a thick volumes, the storage automation entity can first execute a command such as grouped_pool_move_capacity gp=pool_name
source=$N$ target=$M$ size=$X$ (8)

to move storage units 60 from the thin pool to the thick pool, and then create a thick volume in the thick pool using the moved storage units. Upon allocating the actual space that is needed to ensure that a thick volume can be successfully created, the space can then be moved to the thick pool.

In order to simplify space reporting, when the hypervisor queries space the storage automation entity may report only on the combined status of the thin and thick pools. Additional the storage automation entity may report on the meta pools, however the entity may never report on the massive over provisioning of the meta pool but rather report the physical size of the meta pool as being the meta pool physical and logical size.

Upon receiving commands to create a volume that the storage automation entity identifies as a meta volume, the entity can ignore the requested pool and always place the volumes in the meta volume. The response can indicate that the volume was created in the requested storage type, and if queried the storage automation entity can continue to report that the volume was created when it was requested rather than when the volume was actually created.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A storage system, comprising:
   one or more storage devices; and
   a processor arranged:
      to configure the one or more storage devices as a plurality of physical storage units, each of the physical storage units having a storage granularity,
      to configure, on the one or more storage devices, a thin provisioned storage pool having a physical number of the physical storage units and a logical number of logical storage units, and
      upon receiving a request to create a thick data volume having a requested number of the physical storage units:
         to identify an available number of the physical storage units that are available in the thin provisioned pool, and
         to allocate a certain number of physical storage units based upon a determination of the identifying.

2. The storage system according to claim 1, wherein the processor is configured to identify the available number of the physical storage units based on a number of data volumes in the thin provisioned storage pool and a respective amount of data stored in each of the data volumes.

3. The storage system according to claim 1, wherein the processor is configured to determine the logical number of the logical storage units that are available in the thin pool, and to allocate the requested number of the physical storage units from the thin pool upon determining that the requested number of the physical storage units is less than the logical number of the logical storage units that are available in the thin pool.

4. The storage system according to claim 3, wherein the processor is configured to fail the request upon determining that the requested number is greater than or equal to the number of the logical storage units that are available.

5. The storage system according to claim 3, wherein the processor is configured to determine the number of the logical storage units that are available in the thin provisioned storage pool based a number of data volumes in the thin provisioned storage pool and the storage granularity.

6. The storage system according to claim 3, wherein upon allocating the requested number of the physical storage units, the processor is configured to subtract the requested number from the available physical number and to subtract the requested number from the number of the logical storage units that are available.

7. The storage system according to claim 1, wherein the processor is configured to fail the request upon determining that the requested number is greater than or equal to the available number of the physical storage units.

8. A method, comprising:
   configuring one or more storage devices as a plurality of physical storage units, each of the physical storage units having a storage granularity;
   configuring, on the one or more storage devices, a thin provisioned storage pool having a physical number of the physical storage units and a logical number of logical storage units; and
   upon receiving a request to create a thick data volume having a requested number of the physical storage units:
      identifying an available number of the physical storage units that are available in the thin provisioned pool; and
      allocating a certain number of physical storage units based upon a determination of the identifying.

9. The method according to claim 8, wherein identifying the available number of the physical storage units comprises identifying on a number of data volumes in the thin provisioned storage pool, and identifying a respective amount of data stored in each of the data volumes.

10. The method according to claim 8, and comprising determining the logical number of the logical storage units that are available in the thin pool, and allocating the requested number of the physical storage units from the thin pool upon determining that the requested number of the physical storage units is less than the logical number of the logical storage units that are available in the thin pool.

11. The method according to claim 10, and comprising failing the request upon determining that the requested number is greater than or equal to the number of the logical storage units that are available.

12. The method according to claim 10, wherein determining the number of the logical storage units that are available in the thin provisioned storage pool comprises identifying a number of data volumes in the thin provisioned storage pool, and identifying the storage granularity.

13. The method according to claim 10, and comprising upon allocating the requested number of the physical storage units, subtracting the requested number from the available physical number and to subtract the requested number from the number of the logical storage units that are available.

14. The method according to claim 8, and comprising failing the request upon determining that the requested number is greater than or equal to the available number of the physical storage units.

15. A computer program product, the computer program product comprising:
- a non-transitory computer readable storage medium having computer readable program code embodied therewith, the computer readable program code comprising:
- computer readable program code arranged to configure one or more storage devices as a plurality of physical storage units, each of the physical storage units having a storage granularity;
- computer readable program code arranged to configure, on the one or more storage devices, a thin provisioned storage pool having a physical number of the physical storage units and a logical number of logical storage units; and
- upon receiving a request to create a thick data volume having a requested number of the physical storage units:
- computer readable program code configured to identify an available number of the physical storage units that are available in the thin provisioned pool; and
- computer readable program code configured to allocate a certain number of physical storage units based upon a determination of the identifying.

16. The computer program product according to claim 15, wherein the computer readable program code is configured to identify the available number of the physical storage units by identifying on a number of data volumes in the thin provisioned storage pool, and identifying a respective amount of data stored in each of the data volumes.

17. The computer program product according to claim 15, and comprising computer readable program code configured to determine the logical number of the logical storage units that are available in the thin pool, and to allocate the requested number of the physical storage units from the thin pool upon determining that the requested number of the physical storage units is less than the logical number of the logical storage units that are available in the thin pool.

18. The computer program product according to claim 17, and comprising computer readable program code configured to fail the request upon determining that the requested number is greater than or equal to the number of the logical storage units that are available.

19. The computer program product according to claim 17, and comprising computer readable program code configured upon allocating the requested number of the physical storage units, to subtract the requested number from the available physical number and to subtract the requested number from the number of the logical storage units that are available.

20. The computer program product according to claim 15, and comprising computer readable program code configured to fail the request upon determining that the requested number is greater than or equal to the available number of the physical storage units.

* * * * *